United States Patent
Yang (10) Patent No.: US 9,615,195 B2
(45) Date of Patent: Apr. 4, 2017

(54) MEDIA FILE SHARING METHOD AND SYSTEM

(71) Applicant: HUIZHOU TCL MOBILE COMMUNICATION CO., LTD., Huizhou, Guangdong (CN)

(72) Inventor: Rui Yang, Huizhou (CN)

(73) Assignee: Huizhou TCL Mobile Communication CO., Ltd, Huizhou (CN)

(*) Notice: Subject to any disclaimer, the term of this patent is extended or adjusted under 35 U.S.C. 154(b) by 45 days.

(21) Appl. No.: 14/432,617

(22) PCT Filed: Apr. 3, 2014

(86) PCT No.: PCT/CN2014/074730
§ 371 (c)(1),
(2) Date: Mar. 31, 2015

(87) PCT Pub. No.: WO2015/062203
PCT Pub. Date: May 7, 2015

(65) Prior Publication Data
US 2016/0057563 A1 Feb. 25, 2016

(30) Foreign Application Priority Data

Nov. 4, 2013 (CN) .......................... 2013 1 0539605

(51) Int. Cl.
*H04W 4/00* (2009.01)
*H04L 12/28* (2006.01)
(Continued)

(52) U.S. Cl.
CPC .......... *H04W 4/008* (2013.01); *H04B 5/0031* (2013.01); *H04L 12/2809* (2013.01);
(Continued)

(58) Field of Classification Search
CPC .......... H04W 4/00; H04W 76/02; H04B 5/00; H04L 29/06; H04L 67/34; H04L 67/04;
(Continued)

(56) References Cited

U.S. PATENT DOCUMENTS

2012/0139951 A1* 6/2012 Hwang ............... G06F 3/04883
345/665
2012/0208161 A1 8/2012 Takata et al.
(Continued)

FOREIGN PATENT DOCUMENTS

CN 101202977 A 6/2008
CN 102315864 A 1/2012
(Continued)

OTHER PUBLICATIONS

Microsoft, DLNA overview, 2008 https://www.google.com/url?sa=t&rct=j&q=&esrc=s&source=web&cd=6&cad=rja&uact=8&ved=0ahUKEwjasIXhIJXMAhVF1x4KHaE3CbgQFghBMAU&url=http%3A%2F%2Fdownload.microsoft.com%2Fdownload%2Ff%2F0%2F5%2Ff05a42ce-575b-4c60-82d6-208d3754b2d6%2Fdlna_part_1_rs08.pptx&usg=AFQjCNG89eVk8pW3ovx-HMY5GIaB72O81A.*
(Continued)

*Primary Examiner* — Ping Hsieh
*Assistant Examiner* — James Yang
(74) *Attorney, Agent, or Firm* — Ladas & Parry LLP (57) ABSTRACT

A media file sharing method and a media file sharing system are provided. The sharing method comprises: presetting and saving an LAN, a DLNA application and a media file that are default during a sharing process; establishing a sharing pair relationship between a master device and a slave device in the DLNA application; generating an NFC triggering label embedded in the master device according to the LAN, the DLNA application, the media file and the sharing pair
(Continued)

relationship; activating the NFC triggering label by the master device through an NFC sensing operation; the master device and the slave device logging into the LAN and the DLNA application that are default according to the NFC triggering label and completing the sharing pairing according to the sharing pair relationship; receiving the media file from the master device by the slave device and completing processing of the media file.

17 Claims, 4 Drawing Sheets

(51) Int. Cl.
*H04B 5/00* (2006.01)
*H04L 29/06* (2006.01)
*H04W 76/02* (2009.01)
*H04W 84/12* (2009.01)
*H04W 84/20* (2009.01)

(52) U.S. Cl.
CPC .......... *H04L 12/2812* (2013.01); *H04L 65/60* (2013.01); *H04W 76/023* (2013.01); *H04L 2012/2849* (2013.01); *H04W 84/12* (2013.01); *H04W 84/20* (2013.01)

(58) Field of Classification Search
CPC . H04L 63/083; H04L 41/0893; G06F 3/0484; G06F 3/04886; H04M 3/42178; H04N 5/4403; H04N 21/6334
See application file for complete search history.

(56) References Cited

U.S. PATENT DOCUMENTS

| | | |
|---|---|---|
| 2012/0208461 A1 | 8/2012 | Choi et al. |
| 2012/0287034 A1 | 11/2012 | Park et al. |
| 2013/0023258 A1 | 1/2013 | Choi et al. |
| 2013/0055303 A1* | 2/2013 | Kannan ............... H04L 41/0893 725/25 |
| 2013/0305291 A1* | 11/2013 | Dua .................. H04L 29/06027 725/48 |
| 2015/0100900 A1 | 4/2015 | Mao et al. |

FOREIGN PATENT DOCUMENTS

| | | |
|---|---|---|
| CN | 102710986 A | 10/2012 |
| CN | 103051361 A | 4/2013 |
| CN | 103188628 A | 7/2013 |
| CN | 103200378 A | 7/2013 |
| CN | 103327387 A | 9/2013 |
| CN | 102932412 A | 2/2014 |
| WO | WO2006115842 * | 11/2006 |
| WO | WO2006115842 A2 | 11/2006 |

OTHER PUBLICATIONS

English translation of CN 102932412.
English translation of CN 103188628.
English translation of CN 103327387.
English translation of CN102710986.
English translation of CN101202977.
English translation of CN102315864.
English translation of CN103200378.
English translation of CN103051361.

* cited by examiner

MEDIA FILE SHARING METHOD AND SYSTEM

RELATED APPLICATION

This application is a national phase entry under 35 USC 371 of International Patent Application No PCT/CN2014/074730 filed on 3 Apr. 2013, which claims priority from Chinese Patent Application No. 2013105396053 filed on 4 Nov. 2013, the disclosures of which are incorporated in their entirety by reference herein.

FIELD OF THE INVENTION

The present disclosure generally relates to the technical field of digital living network technologies, and more particularly, to a media file sharing method and a media file sharing system.

BACKGROUND OF THE INVENTION

The DLNA (Digital Living Network Alliance) technology is a kind of network information technology that is intended to allow a plurality of kinds of playing devices to interconnect and communicate with each other via a wireless network such as a local area network (LAN) so as to achieve unlimited sharing of media files. By means of the DLNA technology, various kinds of playing devices such as mobile phones, computers and TV sets can intelligently communicate media files with each other so that entertainment and cooperation among a plurality of persons can be achieved through in-time sharing of screens of the playing devices.

In the prior art, when a media file is to be shared between a master device and a slave device through use of the DLNA technology, the user needs to activate and log into the wireless network and the DLNA application to search for the media file to be shared through browsing multiple layers of operation catalogues, search for slave devices that are in a connected state through the wireless network, select and connect to one of the slave devices that can be shared, create a connection therebetween and then operate the catalogues several times to acquire the shared media file. Therefore, the method for sharing a media file by means of the conventional DLNA technology is rather complex in operation, and tends to cause errors in the user's operations.

Accordingly, there is a need to provide a media file sharing method and a media file sharing system that can solve the aforesaid problems.

SUMMARY OF THE INVENTION

The main technical problem to be solved by the present disclosure is to provide a media file sharing method and a media file sharing system that can achieve sharing of a file quickly through very simple operations and at a high accuracy.

To solve the aforesaid technical problem, a technical solution adopted by the present disclosure is to provide a media file sharing method, which comprises: presetting and saving a local area network (LAN), a DLNA application and a media, file that are default during a sharing process; establishing a sharing pair relationship between a master device and a slave device in the DLNA application; generating an NFC triggering label embedded in the master device according to the LAN, the DLNA application, the media file and the sharing pair relationship; activating the NFC triggering label by the master device through an NFC sensing operation; the master device and the slave device logging into the LAN and the DLNA application that are default according to the NFC triggering label and completing the sharing pairing according to the sharing pair relationship; and receiving the media file from the master device by the slave device and completing the processing of the media file.

Preferably, the step of establishing a sharing pair relationship between a master device and a slave device in the DLNA application comprises: acquiring a slave device that is in a connected state from the DLNA application; and matching a type of the slave device with a type of a media file to be shared by the master device, and establishing the sharing pair relationship between the master device and the slave device after the matching is successful.

Preferably, the master device and the slave device both have a display screen respectively, and the step of completing the processing of the media file by the slave device comprises: displaying an operation interface for controlling a displaying content of a display screen of the slave device on the display screen of the master device so that the media file is processed by the master device; or displaying the operation interface on the display screen of the slave device so that the media file is processed by the slave device.

Preferably, between the step of receiving the media file from the master device by the slave device and the step of completing processing of the media file, the sharing method further comprises: matching the type of the slave device with the type of the media file, and finishing the processing of the media file if the matching is successful; and giving a piece of alert information if the matching fails so as to prompt that the slave device is not able to identify the media file.

Preferably, the LAN is a WiFi network, the master device is a mobile phone and the slave device is a TV set, or the master device is a TV set and the slave device is a mobile phone.

Preferably, the step of generating an NFC trigger label, comprises: searching for and selecting the default LAN during the sharing process; presetting and saving the DLNA application and the slave device that are default during the sharing process; verifying whether information of the default slave device is correct; generating the NFC triggering label; and presetting and saving information of the LAN and the DLNA application of the slave device.

Preferably, the step of the master device and the slave device logging into the LAN and the DLNA application that are default according to the NFC triggering label and completing the sharing pairing according to the sharing pair relationship, comprises: verifying whether the default LAN has been activated; if it is verified that the default LAN has not been activated, then initiating a request for connecting to the default LAN until the master device and the slave device are both connected into the LAN; verifying whether the default DLNA application has been activated; if it is verified that the default DLNA application has not been activated, then activating the default DLNA application until the master device and the slave device are both joined into the DLNA application; acquiring ail of slave devices that are currently available in the DLNA application after the step of activating the NFC triggering label; searching for the slave device that has the sharing pair relationship.

Preferably, the step of receiving the media file from the master device by the slave device and completing the processing the media file, comprises: transmitting the media file to be shared; verifying whether the media file is able to be processed by the slave device; if it is verified that the media file is able to be processed, then completing the processing of the media file by the slave device; if it is verified that the media file is not able to be processed by the slave device, then inquiring whether the user is to select another media file to be shared or select another slave device, or inquiring whether the user is to close the DLNA application and the activated LAN; continuing to perform the step of transmitting the media file to be shared if the user selects the another media file or the another slave device; closing the DLNA application, exiting from the DLNA connection that has been established and closing the LAN if the user selects to close the DLNA application and the activated LAN.

To solve the aforesaid technical problem, another technical solution adopted by the present disclosure is to provide a media file sharing system, which comprises a master device and a slave device. The master device comprises a first sharing setting module, a first touch sensing module and a sharing transmission module, and the slave device comprises a second sharing setting module, a second touch sensing module, a receiving module and a processing module. The first sharing setting module and the second sharing setting module are configured to preset and save a local area network (LAN), a DLNA application and a media file, which are default during a sharing process, in the master device and the slave device respectively, and establish a sharing pair relationship between the master device and the slave device in the DLNA application, and generate an NFC triggering label embedded in the master device according to the LAN, the DLNA application, the media file and the sharing pair relationship. The first touch sensing module and the second touch sensing module are configured to activate the NFC triggering label embedded in the master device through an NFC sensing operation so that the master device and the slave device log into the LAN and the DLNA application that are default according to the NFC triggering label and complete the sharing pairing according to the sharing pair relationship. The sharing transmission module is configured to transmit the media file to be shared to the receiving module so that the processing module completes the processing of the media file.

Preferably, the first sharing setting module is further configured to acquire a slave device that is in a connected state from the DLNA application, and match a type of the slave device with a type of a media file to be shared by the master device so as to establish the sharing pair relationship between the master device and the slave device after the matching is successful.

Preferably, the master device is provided with a first display screen, the slave device is provided with a second display screen, the first display screen is configured to display an operation interface for controlling a displaying content of the second display screen so that the media file is processed by the master device.

Preferably, the master device further comprises a prompting module, the processing module is configured to match the type of the slave device with the type of the media file, and the prompting module is configured to inform the master device if the matching is successful and gives a piece of alert information to the master device if the matching fails so as to prompt that the slave device is not able to process the media file.

Preferably, the LAN is a WiFi network, the master device is a mobile phone and the slave device is a TV set, or the master device is a TV set and the slave device is a mobile phone.

To solve the aforesaid technical problem, a further technical solution adopted by the present disclosure is to provide a media file sharing method, which comprises: presetting and saving a local area network (LAN) and a DLNA application that are default during a sharing process; establishing a sharing pair relationship between a master device and a slave device in the DLNA application; generating an NFC triggering label embedded in the master device according to the LAN, the DLNA application and the sharing pair relationship; activating the NFC triggering label by the master device; the master device and the slave device logging into the LAN and the DLNA application that are default according to the NFC triggering label, and completing the sharing pairing according to the sharing pair relationship; and receiving a media file to be shared from the master device by the slave device and completing the processing of the media file.

Preferably, the NFC triggering label is activated by the master device though an NFC sensing operation.

Preferably, the NFC sensing operation is a contact-type or a close-distance contact-less inductive card swiping action between the master device and the slave device.

Preferably, the slave device receives the media file to be shared from the master device through wireless network transmission, Bluetooth data transmission or infrared transmission.

The present, disclosure has the following benefits: as compared to the prior art, the present disclosure presets an LAN, a DLNA application, a media file and a sharing pair relationship between a master device and a slave device for use in a sharing process, and generates an NFC triggering label embedded in the master device accordingly, so when a sharing process is needed, the master device and the slave device can automatically log into the LAN and the DLNA application that are default, complete the sharing pairing, and automatically transmit and process the media file therebetween by simply activating the NFC triggering label through an NFC sensing operation. Thereby, sharing of the media file can be achieved simply, quickly, and accurately.

DETAILED DESCRIPTION OF THE INVENTION

The present disclosure mainly provides a media file sharing method. This method mainly generates an NFC triggering label according to an LAN, a DLNA application, a media file to be shared and a sharing pair relationship between a master device and a slave device during a sharing process in advance, and by simply triggering or activating the NFC triggering label through an NFC sensing operation during the subsequent sharing process, the master device and the slave device can automatically call their respective background programs to log into the LAN and the DLNA application that are default and automatically transmit the media file after the sharing pairing is completed. Thereby, sharing of a media file can be achieved simply, quickly, and accurately.

The present disclosure will be detailed with reference to FIGS. 1~4 and embodiments thereof.

Figure 1:
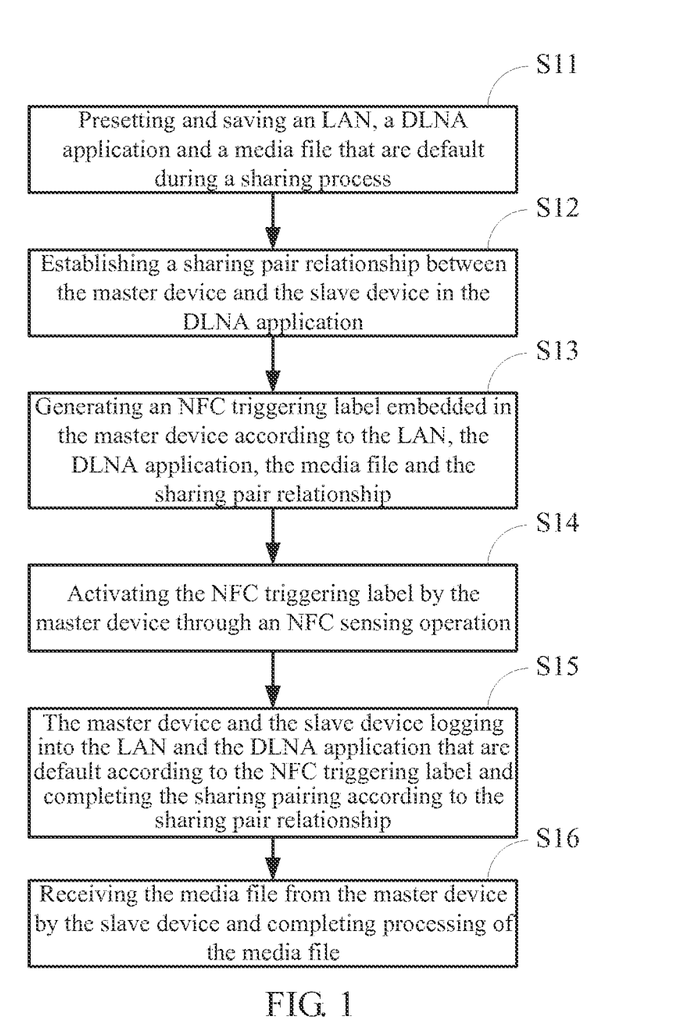
FIG. 1 is a flowchart diagram of a media file sharing method according to a first embodiment of the present disclosure.

FIG. 1 is a flowchart diagram of a media file sharing method according to a first embodiment of the present disclosure. As shown in FIG. 5, the sharing method of this embodiment mainly comprises the following steps:

Step S11: presetting and saving an LAN, a DLNA application and a media file that are default during a sharing process.

In this embodiment, the LAN is preferably a WiFi network, the master device is a mobile phone and the slave device is a TV set, or the master device is a TV set and the slave device is a mobile phone. Of course, the master device and the slave device are not limited to a mobile phone or a TV set, and may be any terminal device that has a DLNA access function, including various playing and processing devices such as a PAD, a PC computer, a sound box, a portable communication device and etc.

The LAN that is preset and stored preferably comprises such information as the name, the account, the password, the MAC address of the pairing device of the LAN, and so on. The DLNA application preferably comprises the name of the DLNA application and the name information of each of the devices connected therein; and the media file preferably comprises such information as the file name, the file format, the memory size occupied by the file, or the like information of the media file to be shared.

Step S12: establishing a sharing pair relationship between the master device and the slave device in the DLNA application.

In this embodiment, the method of establishing the sharing pair relationship is preferably the following: the user predetermines that the master device and the slave device that performs the media file sharing are both devices that can be connected in the default DLNA application, and then directly defines the sharing pair relationship therebetween through manual input.

In other embodiments, the sharing pair relationship may also be established in the following way: the user activates the wireless network access function of the master device in advance, and then searches for and logs into the LAN and the DLNA application in the step S11. In this case, an underlying service component of the DLNA application automatically adds the master device into the DLNA sharing device group in the DLNA application, and acquires therefrom the information of all available DLNA devices (i.e., the slave devices) that are in a connected state to form a shortcut list. The shortcut list comprises the name and a corresponding icon of each of the slave devices.

Afterwards, the user selects a slave device from the shortcut list, and the master device automatically matches a type of the slave device with a type (i.e., a file format) of a media file to be shared to determine whether the slave device can process the media file. If the determination result is "yes" (i.e., if the matching is successful), then the sharing pair relationship between the master device and the slave device is established; and if the determination result is "no", then the user is prompted to select another slave device, and the process continues until the matching is successful. Or, the user directly selects a slave device manually according to the type of the media file to be shared and will not perform the matching process to establish the sharing pair relationship.

Step S13: generating an NFC triggering label embedded in the master device according to the LAN, the DLNA application, the media file and the sharing pair relationship.

In this embodiment, the NFC triggering label is preferably embodied as a data packet. For example, the name of the LAN is china.net, the name of the DLNA application is ce.dlna, the name of the media file to be shared is wispro.rmvb, the sharing pair relationship refers to the pairing between the master device no.a and the slave device no.b, and thus the data packet generated may be china.net-ce.dlna-wispro.rmvb-no.a-no.b. Of course, each of the aforesaid names may also be transformed into corresponding codes. For example, china.net corresponds to the code 001, ce.dlna corresponds to the code 002, wispro.rmvb corresponds to the code 003, no.a corresponds to the code 004, and no.b corresponds to the code 005, and thus the data packet generated is 001002003004005006. It should be appreciated that, the aforesaid example is only for purpose of description rather than to limit the present disclosure; and other limitations may be made depending on the actual need, for example, the corresponding order of each of the names in the data packet may be adjusted in other ways.

Furthermore, when a media file of the master device is to be shared to a plurality of slave devices in this embodiment, an NFC triggering label may be set to comprise one or more data packets as long as each data packet comprises the LAN, the DLNA application, the media file and the information of the master device and the slave device that have the sharing pair relationship therebetween. Furthermore, in other embodiments, the NFC triggering label may also be set in the slave device.

Step S14: activating the NFC triggering label by the master device through an NFC sensing operation.

The NFC sensing operation of this embodiment is specifically embodied as a contact-type or a close-distance contact-less inductive card swiping action between the master device and the slave device, that is, a fool-style card swiping operation in the conventional sense.

Step S15: the master device and the slave device logging into the LAN and the DLNA application that are default according to the NFC triggering label and completing the sharing pairing according to the sharing pair relationship.

After the NFC triggering label is activated, the master device and the slave device will activate their respective network access functions respectively to search for and log into the LAN and the DLNA application that are default in the NFC triggering label; and once the master device has found the slave device through searching according to the preset sharing pair relationship in the DLNA application, the pairing is completed. The sharing pair relationship in this embodiment actually refers to the fact that the master device and the slave device can perform the media file sharing in a same DLNA application.

Step S36: receiving the media file from the master device by the slave device and completing processing of the media file.

Although the master device has matched the type of the media file with the type of the slave device in the step S12, this embodiment still needs to match the type of the slave device with the type of the media file after the media file from the master device is received by the slave device in order to further guarantee that the shared media file can be processed by the slave device. The media file is processed if the matching is successful, and if the matching fails, preferably a piece of alert information is given to prompt the user that the slave device cannot identify the media file so that the user can select another slave device.

Furthermore, when the master device and the slave device of this embodiment both have a display screen, the process of processing the media file preferably comprises: an operation interface for controlling a displaying content of a display screen of the slave device and the previewing information are displayed on the display screen of the master device, a processing instruction is transmitted through the operation interface displayed, and the slave device responds to the processing instruction of the master device so that the media file is processed by the master device. Alternatively, the operation interface is displayed on the display screen of the slave device so that the media file is processed by the slave device. In this embodiment, the processing of the media file comprises such operations as playing, pausing, deleting, fast forward, rewinding, switching to a previous/next media file for playing, skipping to a certain playing position to continue the playing, increasing the volume or decreasing the volume and etc.

Accordingly, this embodiment generates the NFC triggering label by combining the NFC sensing technology with the DLNA application technology and presetting the default LAN, the DLNA application, the media file and the sharing pair relationship between the master device and the slave device during the sharing process. Thereby, the transmission of the media file can be automatically completed only through a simple card swiping action, thus achieving sharing of a media file simply, quickly and accurately.

The present disclosure further provides a media file sharing method according to a second embodiment, which is described on the basis of the first embodiment. This embodiment differs from the first embodiment in the following respects.

The media file is not preset in the step S11, and correspondingly the NFC triggering label generated in the step S13 does not have such information as the name of the media file either. In the step S16, the slave device receives the media file through use of such near field or far field communication technologies as wireless network transmission, Bluetooth data transmission, or infrared transmission instead of receiving the media file from the master device through the near field communication transmission during the NFC sensing operation as in the first embodiment.

Accordingly, this embodiment may allow the user to, after one time of NFC sensing operation, select different media files for purpose of sharing flexibly multiple times. Therefore, generating a corresponding NFC triggering label in advance before each time of sharing is avoided and the operation becomes easier.

Figure 2:
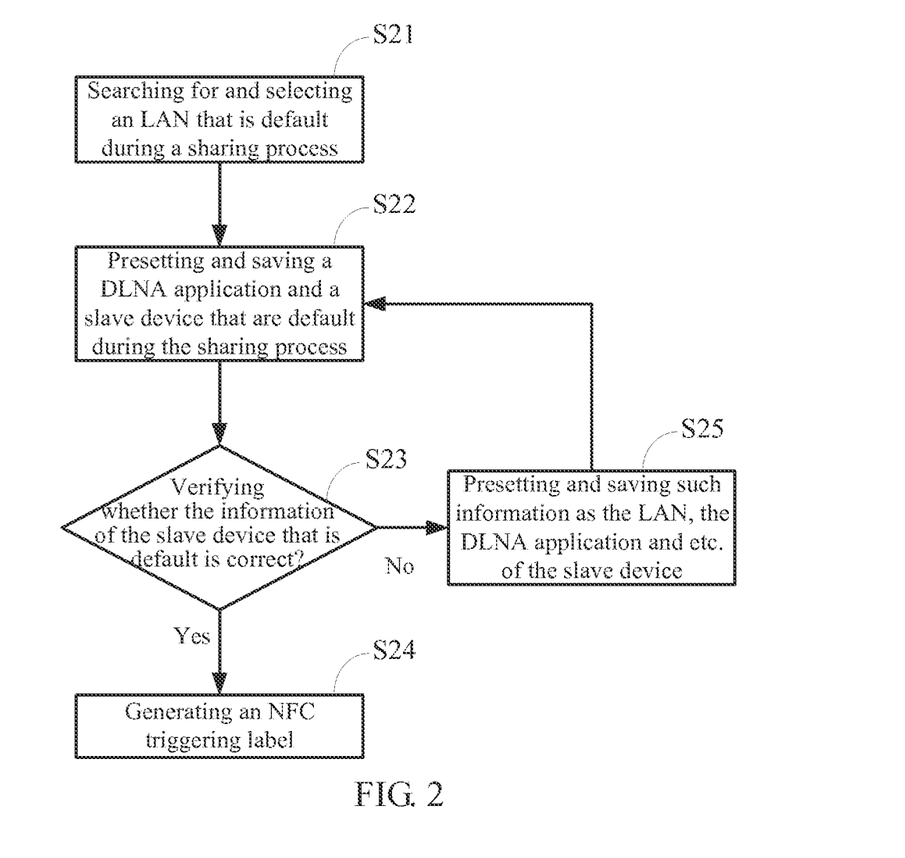
FIG. 2 is a flowchart diagram of a step of generating an NFC triggering label in a media file sharing method according to a third embodiment of the present disclosure.

The present disclosure further provides a media file sharing method according to a third embodiment, which is described on the basis of the first embodiment. In this embodiment, the process of generating the NFC triggering label is as shown in FIG. 2 and mainly comprises the following steps:

Step S21: searching for and selecting a default LAN during a sharing process.

The user activates the wireless network access function of the master device through a setting interface (e.g., one-touch sharing setting interface). After a series of preparation steps before accessing the network such as searching for a current network, determining whether the network operates normally, and inquiring whether to connect to the network immediately, all LANs currently available are searched and displayed so that the user selects one LAN therefrom and connects the master device to this LAN.

Step S22: presetting and saving a DLNA application and a slave device that are default during the sharing process.

After having confirmed to connect the master device to the LAN, the user inputs in, through a manual setting interface, such information as the name of the DLNA application and the name of the slave device that are selected in advance for use in the sharing.

Step S23: verifying whether the information of the default slave device is correct.

After having been connected to the LAN, the master device begins to search for the slave device preset in the step S22 through a related application program or an underlying service component in the DLNA application, and, after the slave device is obtained through searching, acquires such information as the LAN and the DLNA application that are set by the slave device.

Step S24: generating an NFC triggering label.

If it is verified that the slave device has the same information such as the LAN and the DLNA application as the master device, then it is determined that the information of the slave device is correct and the slave device and the master device have a sharing pair relationship therebetween. Then, the master device generates the NFC triggering label comprising information of the LAN, the DLNA application, the media file, and the master device and the slave device.

Step S25: presetting and saving information of the LAN and the DLNA application of the slave device.

If it is verified that at least one of such information as the LAN, the DLNA application and etc. that are set by the slave device is different from that of the master device, then it, is determined that the information of the slave device is incorrect and the slave device and the master device do not have the sharing pair relationship therebetween. In this case, the user will re-set such information as the LAN, the DLNA application and etc. of the slave device through the setting interface of the slave device and perform the step S23 again until the NFC triggering label is generated.

Figure 3:
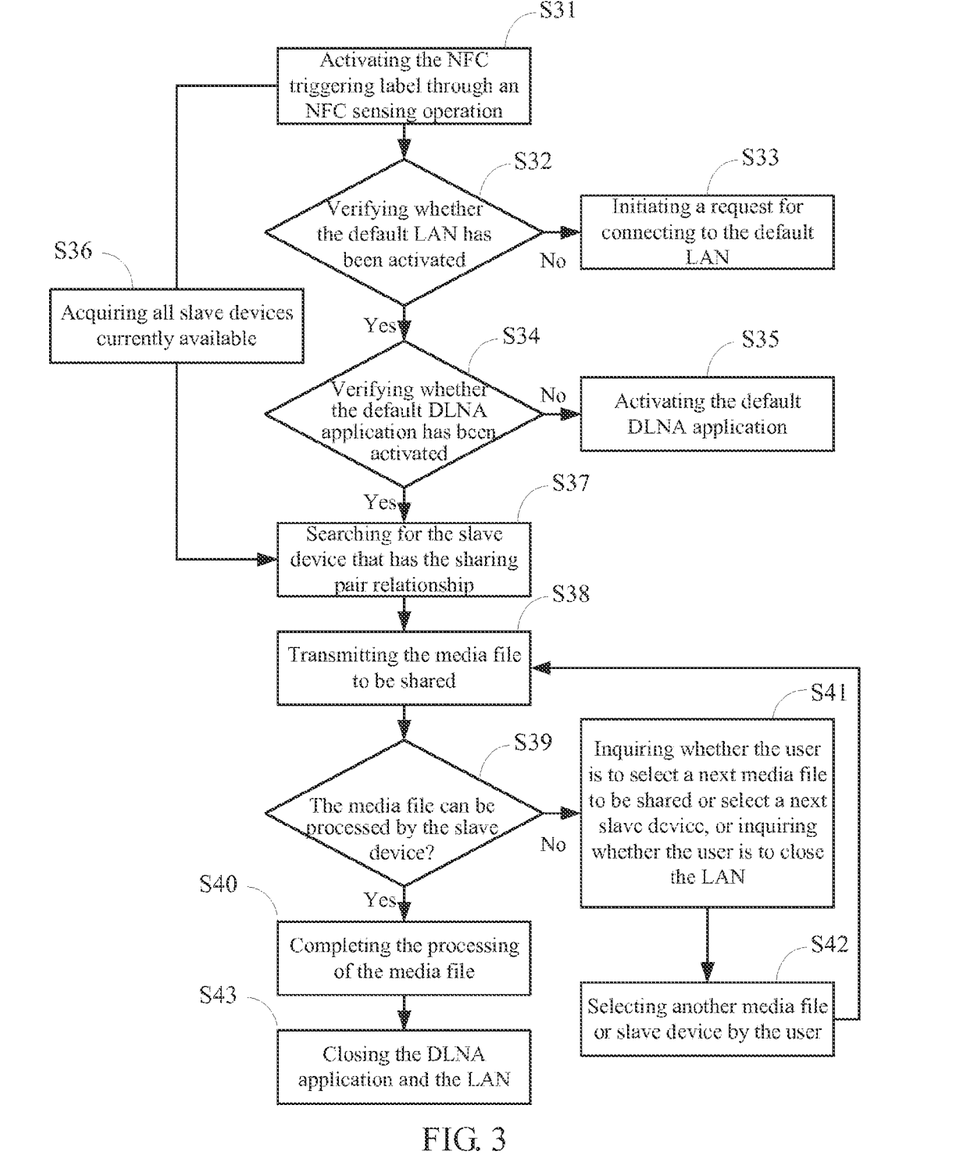
FIG. 3 is a flowchart diagram of a step of sharing a media file in a media file sharing method according to a fourth embodiment of the present disclosure.

The present, disclosure further provides a media file sharing method according to a fourth embodiment, which is described on the basis of the first embodiment. In this embodiment, the process of performing a media file sharing according to an NFC triggering label is as shown in FIG. 3 and mainly comprises the following steps:

Step S31: activating the NFC triggering label through an NFC sensing operation.

During the triggering process, the master device adopts an active read mode, and the slave device adopts a passive read mode.

Step S32: verifying whether the default LAN has been activated.

Step S33: if it is verified that the default LAN has not been activated, then initiating a request for connecting to the default LAN until the master device and the slave device are both connected into the LAN.

Step S34: verifying whether the default DLNA application has been activated.

Step S35: if it is verified that the default DLNA application has not been activated, then activating the default DLNA application until the master device and the slave device are both joined into the DLNA application.

Step S36: after the NFC triggering label is activated in the step S32, acquiring all the slave devices that are currently available in the DLNA application.

Step S37: after the step S34 and the step S36, searching for the slave device that has the sharing pair relationship.

Step S38: transmitting the media file to be shared.

Specifically, this embodiment transmits the file according to the standard DLNA protocol of the prior art, and preferably adopts the 802.11 connection in the Connectivity layer and adopts the V1.0 portion of the UPnPAV protocol in the media management and control layer.

Step S39: verifying whether the media file can be processed by the slave device.

In this embodiment, whether the media file can be processed means whether the slave device can perform one or more of such operations as identifying, decoding, playing on the media file transmitted from the master device.

Step S40: if it is verified that the media file can be processed, then completing the processing of the media file by the slave device.

Step S41: if it is verified that the media file can not be processed by the slave device, then inquiring whether the user is to select a next media file to be shared or select a next slave device, or inquiring whether the user is to close the DLNA application and the activated LAN.

Step S42: continuing to perform the step S38 if the user selects another media file or slave device after the step S41.

Step S43: closing the DLNA application, exiting from the DLNA connection that has been established and closing the LAN if the user selects to close the LAN after the step S41 and after the processing of the media file is completed by the slave device in the step S40.

It should be appreciated that, some of the technical features of the embodiments disclosed above in the present disclosure can be modified or combined by those skilled in the art as needed.

Figure 4:
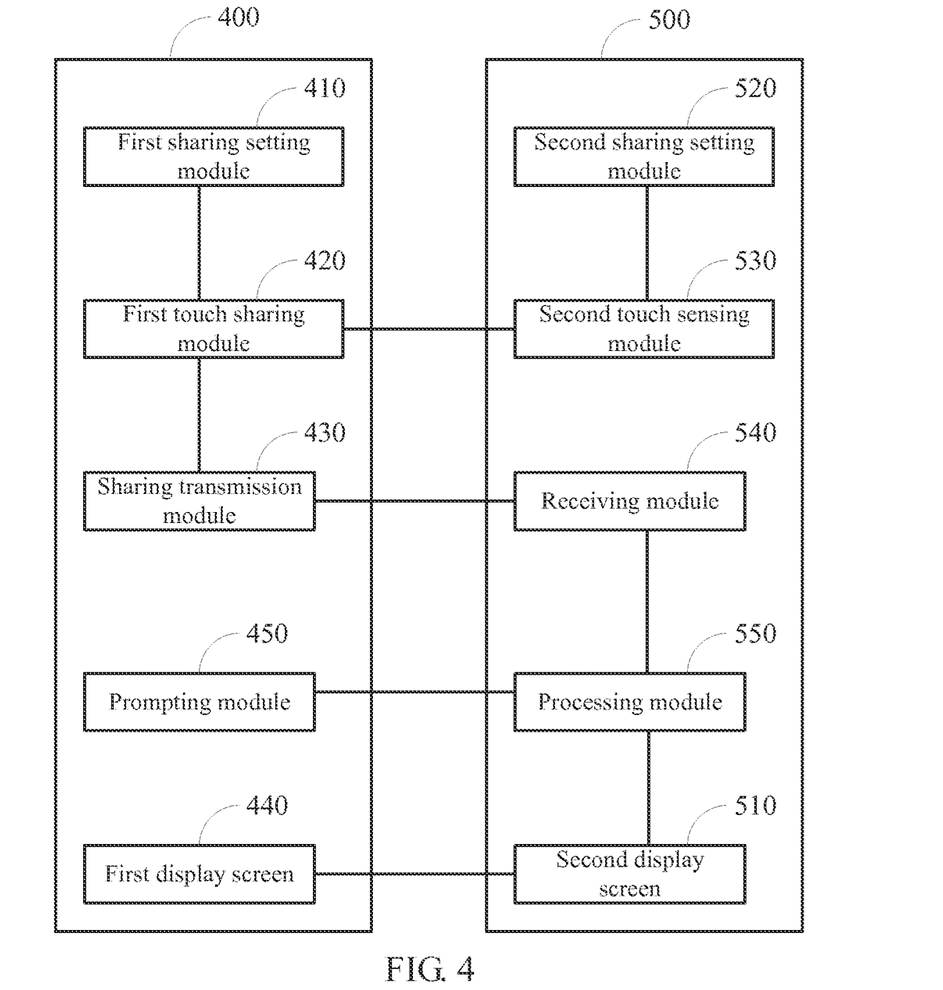
FIG. 4 is a block diagram illustrating principles of an embodiment of a media file sharing system of the present disclosure.

The present disclosure further provides a media file sharing system. As shown in FIG. 4, the sharing system comprises a master device 400 and a slave device 500; the master device 400 of this embodiment comprises a first sharing setting module 410, a first, touch sensing module 420, a sharing transmission module 430, a first, display screen 440, and a prompting module 450; and the slave device 500 comprises a second display-screen 510, a second sharing setting module 520, a second touch sensing module 530, a receiving module 540 and a processing module 550.

Specifically, the first sharing setting module 410 is configured to preset, and save an LAN, a DLNA application and a media file that, are default during a sharing process in the master device 400. The second sharing setting module 520 is configured to preset and save the LAN, the DLNA application and the media file that are default during the sharing process in the slave device 500. The first sharing setting module 410 is further configured to acquire the slave device 500 that is in a connected state from the DLNA application, and match a type of the slave device 500 with a type of a media file to be shared by the master device 400 so as to establish the sharing pair relationship between the master device and the slave device after the matching is successful. Afterwards, an NFC triggering label embedded in the master device 400 is generated according to the LAN, the DLNA application, the media file and the sharing pair relationship.

The first touch sensing module 420 and the second touch sensing module 530 are configured to activate the NFC triggering label embedded in the master device 400 through an NFC sensing operation so that the master device 400 and the slave device 500 log into the LAN and the DLNA application that are default according to the NFC triggering label and complete the sharing pairing according to the sharing pair relationship.

The sharing transmission module 430 is configured to transmit the media file to be shared to the receiving module 540 of the slave device 500 so that the processing module 550 of the slave device 500 completes the processing of the media file. Specifically, the processing module 550 matches the type of the media file received by the receiving module 540 with the type of the slave device 500, and the prompting module 450 is configured to inform the master device 400 if the matching is successful and gives a piece of alert information to the master device 400 if the matching fails so as to prompt that the slave device 500 cannot process the media file.

Furthermore, the second display screen 510 of the slave device 500 may play such multimedia files as an audio, a video or the like under the control of the processing module 550, and the first display screen 440 is configured to display an operation interface for controlling a displaying content of the second display screen 510 so that the media file is processed by the master device 400. Specifically, the processing of the media file comprises such operations as playing, pausing, deleting, fast forward, rewinding, switching to a previous/next media file for playing, skipping to a certain playing position to continue the playing, increasing the volume or decreasing the volume and etc.

In this embodiment, the LAN is a WiFi network, the master device 400 is preferably a mobile phone and the slave device 500 is preferably a TV set, or the master device 400 is preferably a TV set and the slave device 500 is preferably a mobile phone. Furthermore, for the specific operation processes of the master device 400 and the slave device 500 of this embodiment, reference may be made to the method embodiment described above, and the same benefits can be obtained, so they will not be further described herein.

It should be understood that, the division of the individual modules of the master device 400 and the slave device 500 described in this embodiment only represents a division of logical functions, and there may be other division manners in practical implementations. For example, a number of modules may be combined or may be integrated into another system, or some features may be omitted or may not be performed. Furthermore, mutual coupling or communication connections between the modules may be achieved via a plurality of interfaces, or in an electrical way or some other way.

As integral components of the master device 400 and the slave device 500, the aforesaid functional modules may be or may not be physical blocks, may be co-located at a same site or be distributed in a plurality of network units, and may be implemented either in the form of hardware or in the form of software function blocks. The objective of the present disclosure can be achieved by optionally using parts of or all of the modules depending on the actual need.

According to the above descriptions, the present disclosure presets an LAN, a DLNA application, a media file and a sharing pair relationship between a master device and a slave device for use in a sharing process, and generates an NFC triggering label embedded in the master device accordingly, so when a sharing process is needed, the master device and the slave device can automatically log into the LAN and the DLNA application that are default, complete the sharing pairing, and automatically transmit and process the media file therebetween by simply activating the NFC triggering label through an NFC sensing operation. Thereby, sharing of the media file can be achieved simply, quickly, and accurately.

Furthermore, it is apparent to those skilled in the art, the present disclosure also provides a media file sharing system, which comprises a master device and a slave device. The master device and the slave device both comprise a non-transitory program storage medium and a processor respectively. The non-transitory program storage medium stores a program executed by the processor to perform the method as described in above. In addition, it is apparent to those skilled in the art that, various modules 410, 420, 430, 450 of the master device and various modules 520, 530, 540, 550 of the slave device as shown in FIG. 4 are software modules. In another aspect, it is well-known that various software modules inherently are stored in the non-transitory program storage medium and executed by the processor to perform the related functions respectively.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A media file sharing method, comprising:
presetting and saving configurations of a local area network (LAN), information of a digital living network alliance (DLNA) application and information of a media file, wherein the LAN, the DLNA application and the media file are default during a sharing process, the configurations of the LAN comprises a name, an account number, a password of the LAN, and medium access control (MAC) addresses of devices which are to-be-paired; the information of the DLNA application comprises a name of the DLNA application and name information of each of the devices connected therein; and the information of the media file comprises a file name and a file format of the media file and a memory size occupied by the media file;
establishing a sharing pair relationship between a master device and a slave device in the DLNA application, wherein the sharing pair relationship is established by a following way, which comprises: activating a wireless network access function of the master device, searching for and logging into the LAN and the DLNA application by the master device, automatically adding the master device into a DLNA sharing device group in the DLNA application, acquiring information of all available DLNA devices that are in a connected state in the DLNA application to form a shortcut list, and selecting at least one of the available DLNA devices from the shortcut list to be the slave device;
generating an NFC triggering label embedded in the master device according to the LAN, the DLNA application, the media file and the sharing pair relationship;
activating the NFC triggering label by the master device through an NFC sensing operation;
the master device and the slave device logging into the LAN and the DLNA application that are default according to the NFC triggering label and completing the sharing pairing according to the sharing pair relationship; and
receiving the media file from the master device by the slave device and completing the processing of the media file.

2. The sharing method of claim 1, wherein the step of establishing a sharing pair relationship between a master device and a slave device in the DLNA application comprises:
acquiring a slave device that is in a connected state from the DLNA application; and
matching a type of the slave device with a type of a media file to be shared by the master device, and establishing the sharing pair relationship between the master device and the slave device after the matching is successful.

3. The sharing method of claim 1, wherein the master device and the slave device both have a display screen respectively, and the step of completing the processing of the media file by the slave device comprises:
displaying an operation interface for controlling a displaying content of a display screen of the slave device on the display screen of the master device so that the media file is processed by the master device; or
displaying the operation interface on the display screen of the slave device so that the media file is processed by the slave device.

4. The sharing method of claim 3, between the step of receiving the media file from the master device by the slave device and the step of completing processing of the media file, the sharing method further comprises:
matching the type of the slave device with the type of the media file, and finishing the processing of the media file if the matching is successful; and
giving a piece of alert information if the matching fails so as to prompt that the slave device is not able to identify the media file.

5. The sharing method of claim 1, wherein the LAN is a wireless fidelity (WiFi) network, the master device is a mobile phone and the slave device is a TV set, or the master device is a TV set and the slave device is a mobile phone.

6. The sharing method of claim 1, wherein the step of generating an NFC triggering label, comprises:
searching for and selecting the default LAN during the sharing process;
presetting and saving the DLNA application and the slave device that are default during the sharing process;
verifying whether information of the default slave device is correct;
generating the NFC triggering label; and
presetting and saving information of the LAN and the DLNA application of the slave device.

7. The sharing method of 1, wherein the step of the master device and the slave device logging into the LAN and the DLNA application that are default according to the NFC triggering label and completing the sharing pairing according to the sharing pair relationship, comprises:
verifying whether the default LAN has been activated;
if it is verified that the default LAN has not been activated, then initiating a request for connecting to the default LAN until the master device and the slave device are both connected into the LAN;
verifying whether the default DLNA application has been activated;
if it is verified that the default DLNA application has not been activated, then activating the default DLNA application until the master device and the slave device are both joined into the DLNA application;
acquiring all of slave devices that are currently available in the DLNA application after the step of activating the NFC triggering label;
searching for the slave device that has the sharing pair relationship.

8. The sharing method of claim 7, wherein the step of receiving the media file from the master device by the slave device and completing the processing the media file, comprises:
transmitting the media file to be shared;
verifying whether the media file is able to be processed by the slave device;

if it is verified that the media file is able to be processed, then completing the processing of the media file by the slave device;

if it is verified that the media file is not able to be processed by the slave device, then inquiring whether the user is to select another media file to be shared or select another slave device, or inquiring whether the user is to close the DLNA application and the activated LAN;

continuing to perform the step of transmitting the media file to be shared if the user selects the another media file or the another slave device;

closing the DLNA application, exiting from the DLNA connection that has been established and closing the LAN if the user selects to close the DLNA application and the activated LAN.

9. A media file sharing system, comprising a master device and a slave device, wherein the master device comprises a first sharing setting module, a first touch sensing module and a sharing transmission module, and the slave device comprises a second sharing setting module, a second touch sensing module, a receiving module and a processing module, the first sharing setting module and the second sharing setting module are configured to preset and save configurations of a local area network (LAN), information of a digital living network alliance (DLNA) application and information of a media file, in the master device and the slave device respectively, wherein the LAN, the DLNA application and the media file are default during a sharing process, and establish a sharing pair relationship between the master device and the slave device in the DLNA application, and generate an NFC triggering label embedded in the master device according to the LAN, the DLNA application, the media file and the sharing pair relationship, wherein the configurations of the LAN comprises a name, an account number, a password of the LAN, and medium access control (MAC) addresses of devices which are to-be-paired; the information of the DLNA application comprises a name of the DLNA application and name information of each of the devices connected therein; and the information of the media file comprises a file name and a file format of the media file and a memory size occupied by the media file; wherein the sharing pair relationship is established by a following way, which comprises: activating a wireless network access function of the master device, searching for and logging into the LAN and the DLNA application by the master device, automatically adding the master device into a DLNA sharing device group in the DLNA application, acquiring information of all available DLNA devices that are in a connected state in the DLNA application to form a shortcut list, and selecting at least one of the available DLNA devices from the shortcut list to be the slave device;

the first touch sensing module and the second touch sensing module are configured to activate the NFC triggering label embedded in the master device through an NFC sensing operation so that the master device and the slave device log into the LAN and the DLNA application that are default according to the NFC triggering label and complete the sharing pairing according to the sharing pair relationship; and the sharing transmission module is configured to transmit the media file to be shared to the receiving module so that the processing module completes the processing of the media file.

10. The sharing system of claim 9, wherein the first sharing setting module is further configured to acquire a slave device that is in a connected state from the DLNA application, and match a type of the slave device with a type of a media file to be shared by the master device so as to establish the sharing pair relationship between the master device and the slave device after the matching is successful.

11. The sharing system of claim 9, wherein the master device is provided with a first display screen, the slave device is provided with a second display screen, the first display screen is configured to display an operation interface for controlling a displaying content of the second display screen so that the media file is processed by the master device.

12. The sharing system of claim 11, wherein the master device further comprises a prompting module, the processing module is configured to match the type of the slave device with the type of the media file, and the prompting module is configured to inform the master device if the matching is successful and gives a piece of alert information to the master device if the matching fails so as to prompt that the slave device is not able to process the media file.

13. The sharing system of claim 9, wherein the LAN is a wireless fidelity (WiFi) network, the master device is a mobile phone and the slave device is a TV set, or the master device is a TV set and the slave device is a mobile phone.

14. A media file sharing method, comprising:
presetting and saving configurations of a local area network (LAN) and information of a digital living network alliance (DLNA) application, wherein the LAN and the DLNA application are default during a sharing process;

establishing a sharing pair relationship between a master device and a slave device in the DLNA application, wherein the sharing pair relationship is established by a following way, which comprises: activating a wireless network access function of the master device, searching for and logging into the LAN and the DLNA application by the master device, automatically adding the master device into a DLNA sharing device group in the DLNA application, acquiring information of all available DLNA devices that are in a connected state in the DLNA application to form a shortcut list, and selecting at least one of the available DLNA devices from the shortcut list to be the slave device;

generating an NFC triggering label embedded in the master device according to the LAN, the DLNA application and the sharing pair relationship;

activating the NFC triggering label by the master device;

the master device and the slave device logging into the LAN and the DLNA application that are default according to the NFC triggering label, and completing the sharing pairing according to the sharing pair relationship; and receiving a media file to be shared from the master device by the slave device and completing the processing of the media file.

15. The sharing method of claim 14, wherein the NFC triggering label is activated by the master device though an NFC sensing operation.

16. The sharing method of claim 15, wherein the NFC sensing operation is a contact-type or a close-distance contact-less inductive card swiping action between the master device and the slave device.

17. The sharing method of claim 14, wherein the slave device receives the media file to be shared from the master device through wireless network transmission, Bluetooth data transmission or infrared transmission.

* * * * *